July 31, 1934.  C. E. ALLEN  1,968,549
LIQUID HEATER
Filed April 7, 1931
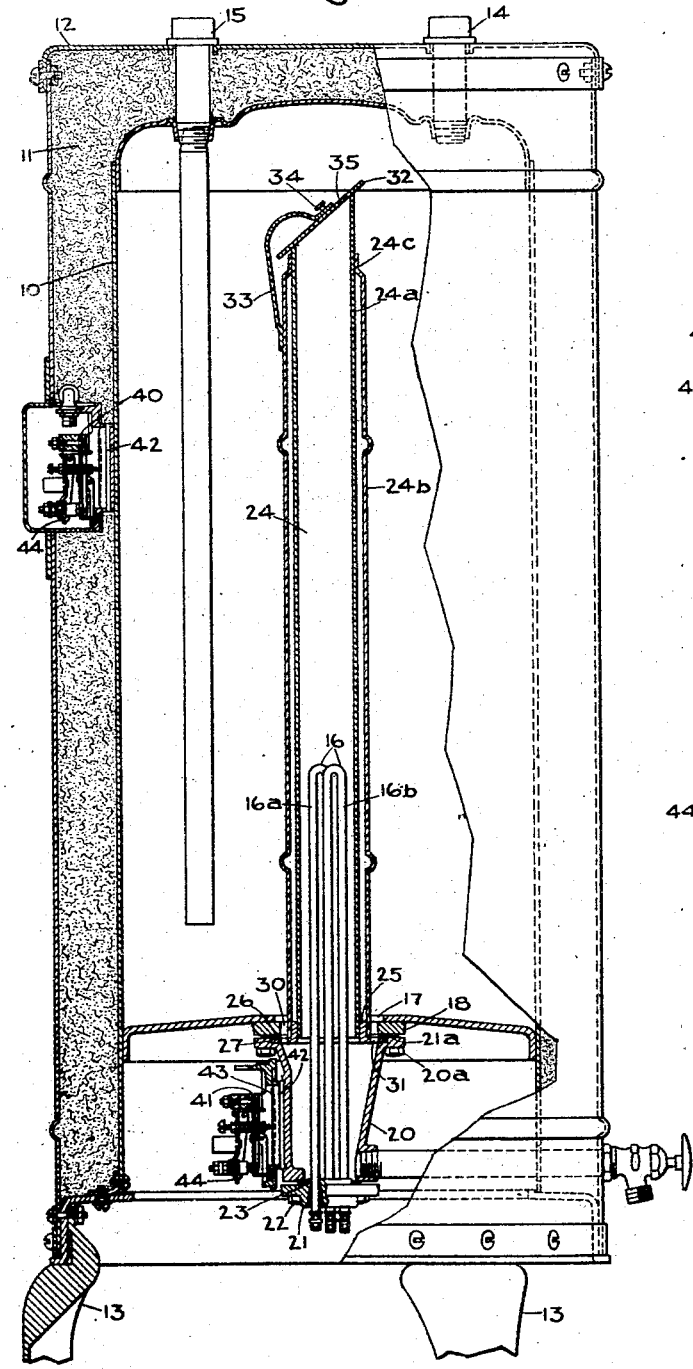
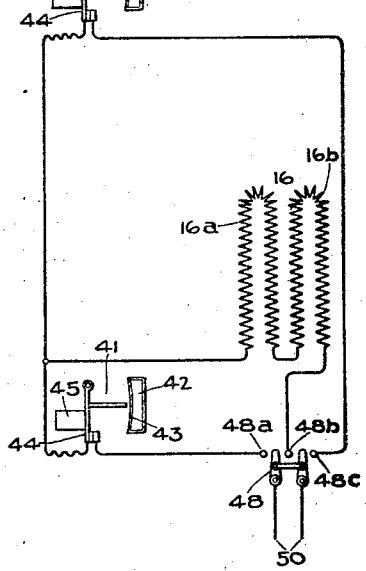
Inventor:
Clyde E. Allen,
by Charles E. Tuller.
His Attorney.

Patented July 31, 1934

1,968,549

UNITED STATES PATENT OFFICE 1,968,549

LIQUID HEATER

Clyde E. Allen, San Francisco, Calif., assignor to Edison General Electric Appliance Company, Incorporated, Chicago, Ill., a corporation of New York Application April 7, 1931, Serial No. 528,367

5 Claims. (Cl. 219—39)

My invention relates to liquid heaters, more particularly to water heaters of the storage type, and has for its object the provision of an improved heater of this character.

At the present time a large proportion of the storage water heaters generally used are provided with a heating element arranged to apply heat to the water in the lower portion of the storage tank, and with thermostatic means for controlling the heating element in accordance with the temperature of the water in this lower region so that the heat will be shut off automatically only when the entire contents of the tank have been heated. This arrangement is objectionable for intermittent water heating service by reason of the fact that frequently when there is a demand for but a relatively small quantity of hot water, the attendant will neglect to turn off the heat when the desired quantity has been provided with the result that the entire contents of the tank will be heated; necessarily a large portion of the heat thus used will be lost through the subsequent cooling of that portion of the water which is not utilized.

My invention in one of its aspects contemplates the provision of an improved water heater whereby either a relatively small quantity or a larger amount of hot water will be provided as demanded, the heating means being automatically shut off when the desired quantity in either case has been provided.

In carrying my invention into effect in one form thereof, I provide suitable means including heating means for delivering heated water to the upper portion of the storage tank, and further provide thermostatic means for controlling the heating means either in accordance with the temperature of the water in an upper region of the tank or in accordance with the temperature of the water in a lower region of the tank, whereby either a relatively small quantity of water may be provided in the upper portion or, if desired, substantially the entire contents of the tank may be heated. Suitable means are provided for controlling the thermostatic means so that the heating means can be controlled at will either in accordance with the temperature of the water in the upper or the lower region of the tank.

For a more complete understanding of my invention, reference should be had to the accompanying drawing in which Fig. 1 illustrates an elevation, partly in section, of a water heater embodying my invention; and Fig. 2 is a diagrammatic view illustrating control means for the heating element of the heater of Fig. 1 arranged in accordance with my invention.

Referring to the drawing, I have shown my invention in one form as applied to an electric heater of the type wherein the heated water is delivered to the upper portion of the storage tank; more specifically, I have shown my invention in connection with the heater described and claimed in the United States Patent No. 1,685,642, granted to F. H. McCormick, dated September 25, 1928. It is to be understood, however, that the application of my invention is not limited to this specific heater, but may be applied to other heaters of the type in which the heated water is delivered to an upper region of the tank; thus for example, my invention is applicable to heaters having an outside circulation heater including an external circulation duct between the top and bottom of the tank. As shown in the drawing, a suitable water storage tank 10 is provided, this tank being surrounded at the top and sides with a suitable heat insulating material 11, such as rock wool, this material being placed between the tank and an outer enclosing casing 12. Suitable supporting legs 13 are provided for the tank 10, together with its casing 12. A hot water service pipe 14 is provided at the top of the tank and so also is a cold water inlet pipe 15 which extends downwardly into the interior of the tank so as to communicate with the water in the lower regions of the tank. The pipe 15 preferably will extend downwardly to within a few inches of the bottom of the tank.

A suitable heating element 16 is arranged in the bottom of the tank. As shown, the bottom of the tank is provided with an opening 17 through which the heating element 16 is inserted. A flange 18 is secured to the bottom of the tank on the exterior thereof, and the heating element 16 is secured to a receptacle-like supporting member 20 which is secured to the flange 18 by any suitable means, such as bolts 20a. Preferably a suitable gasket 21a will be placed between the member 20 and the flange 18 so as to insure a water-tight joint.

Although any suitable heating element may be used, I prefer to use a heating element of the sheathed resistance type, such for example as shown in United States Patent No. 1,367,341, granted to C. C. Abbott, dated February 1, 1921. As shown, the heating element 16 comprises two lengths 16a and 16b, each length being bent at substantially the middle in the form of a hairpin and having its ends secured to and passing through a suitable cap member 21. At the point where the ends of the units pass through the cap 21, soldered, brazed, or welded joints are made between the sheath and the cap so as to form a water-tight connection between the sheath and the caps. The cap member 21 is secured by means of suitable members, such as bolts 22, to the lower end of the member 20 so that the heating element 16 extends upwardly in a substantially vertical direction through the member 20 and the opening 17 into the water tank 10. A suitable gasket 23 is provided between the cap member 21 and the lower end of the receptacle 20 so as to provide a water-tight connection between them. It will be understood that each unit 16a, 16b is provided with a helical heating resistance element (not shown) enclosed in the sheath and embedded in a suitable insulating heat conducting compound, such as powdered magnesium oxide.

Surrounding the heating element 16 is a tube or casing 24 which forms a duct extending centrally of the tank 10 and connecting with the tank at its upper and lower ends. As shown, this duct is provided with double walls 24a and 24b spaced slightly apart to provide a dead-air space between them for heat insulation. The outer wall 24b is provided at its upper end with a reduced portion 24c interfitting with the inner wall 24a and secured thereto in any suitable manner, as by brazing or welding. The two walls are spaced apart at the bottom or their lower ends by a collar 25 to which the walls are secured in any suitable manner, such for example, as by soldering or brazing. The collar 25 is provided with a flange 26, which flange is clamped between the member 20 and the flange 18 provided on the bottom of the tank as is clearly shown in Fig. 1. The foregoing arrangement serves to secure the tubular member 24 in place. As shown, the upper surface of the member 20 is countersunk at 27 to receive the flange 26. The aperture 17 in the bottom wall of the tank 10, the flange 18 and the member 20 are somewhat larger than the outside diameter of the tubular member 24 so that a space 30 is formed around the casing through which water from the bottom of the tank is free to flow downwardly. The flange 26 is provided with a plurality of apertures 31 arranged substantially in a circle about the flange so as to permit the water which flows downwardly through the space 30 to pass through the apertures to the bottom of the casing where it is allowed to come in contact with the heating element 16 and pass upwardly through the casing 24 to be deposited in the upper regions of the tank.

The upper end of the casing 24 is provided with a flap valve 32 for controlling the thermal flow of water upwardly through the duct 24. The upper end of the duct 24 preferably is formed at an angle with the axis of the duct and on the lowest side of the casing, that is, the left-hand side, as viewed in Fig. 1, is secured a suitable temperature-responsive device shown as a bi-metallic thermostatic strip 33. The lower end of this strip is secured to the casing, while the upper end of the strip is curved so as to extend over the adjacent edge of the casing to substantially the central portion of the duct where it is secured to the flap valve 32 in any suitable manner, as by means of a rivet 34.

A relatively small opening 35 is provided in the valve preferably on the right-hand side, as viewed in Fig. 1, of the mechanical connection between the valve and the bi-metallic strip 33. It will be understood that when the water is cold the valve normally will be closed by the tension of the thermostatic strip 33, the aperture 35 serving to permit a restricted flow of water to take place through the duct under these conditions.

In order to control the heating element 16 selectively in accordance with the temperatures of the water in the upper and lower regions of the tank, I provide a plurality of thermostatic devices 40 and 41, the device 40 being secured to the side wall of the tank 10 in thermal relation with the water in the upper portion of the tank and the device 41 being secured to the member 20 in thermal relation with the water in the lower portion of the tank.

These thermostatic devices are arranged to be selectively connected in circuit with the heating element 16 so that either one or the other can be utilized to control the heating element in accordance with the temperature of the water in that region of the tank at which the temperature device is located. These temperature-responsive devices may be of any suitable construction, but are preferably as shown in United States Patent No. 1,456,087, granted to C. C. Abbott, dated May 22, 1923, and, briefly, each comprises a receptacle 42 filled with a suitable gas and provided with a diaphragm 43 which is forced toward the left, as viewed in the figures, by the expansion of the gas. Each device is further provided with a pivoted switch arm 44 biased to its contact-closing position by a suitable weight 45 and arranged so that upon the occurrence of a predetermined temperature the diaphragm will be forced toward the left to operate the switch arm to its open heating circuit position.

In order to selectively control the thermostats 40 and 41 so that either one or the other may be utilized to control the heating element 16 as desired, a suitable control switch 48 is interposed in the electric connections from a suitable electrical supply source 50 to the heating elements and thermostats. The electrical connections between this switch and the heating element 16 and the thermostats 40 and 41 are such that when the switch is in a central neutral position, as shown, the heating element 16 will be disconnected from the supply source 50, while if the switch is in either one or the other of the remaining positions either one or the other of the thermostats 40 and 41 will be connected to control the heating element 16. It will be observed by reference to Fig. 2 that when the switch 48 is in its left-hand position so as to bridge the contacts 48a and 48b, the thermostat 41 will be included in the electrical circuits between the supply source 50 and the heating element 16 so that the heating element will be controlled responsively to the temperature of the water in the lower region of the tank, whereas if the control switch be moved to its right-hand position so as to bridge the contacts 48b and 48c, the thermostat 41 will be excluded while the thermostat 40 will be included in the electrical circuits so as to control the heating element 16 responsively to the temperature of the water in the upper region of the tank.

It will be understood that in either case the controlling thermostat will operate to deenergize the heating element when the water in that portion of the tank to which the thermostat responds attains a predetermined high temperature, such, for example, as 150° F., and will operate to reenergize the heating element when the water in that portion has cooled somewhat to a lower temperature.

Preferably the upper thermostat 40 will be located on the walls of the tank so that a quantity of water sufficiently large to meet the intermittent relatively small demands may be heated in that region of the tank above the thermostat, while the thermostat 41 will be located in the lowermost portion of the tank so that substantially the entire contents of the tank may be heated when this thermostat is operating to control the heating element 16.

In the operation of the heater, assuming that the tank is filled with cold water and that the energizing circuit for the heating element 16 has been closed by movement of the control switch 48 to its left-hand position so as to include the lower thermostat 41 in a controlling circuit for the heating element, the small quantity of water in the duct 24 will be heated immediately and by reason of the restricted thermal flow through the orifice 32 this water will be heated to a desired high temperature, such as 150° F., even though the water in the tank proper be cold. It will be understood that comparatively little loss of heat occurs through the walls of the duct 24 by reason of the heat insulation provided by the air space between the walls 24a and 24b. This small amount of hot water escapes through the opening 35 in the flap valve 34 and arises at once to the top of the tank where it can be drawn off if desired through the hot water service pipe 14. A small quantity of hot water thus is made available within a very short period of time. As the hot water accumulates in the top of the tank, the temperature of the water increases in the vicinity of the bi-metallic strip 23 and the thermostat in responding opens the valve 32 so as to gradually permit an increased flow of water from the upper end of the duct. As the temperature increases the valve is opened gradually thereby permitting a greater rapidity of flow, the arrangement of the thermostats and the valve being such that the water escaping from the duct is heated to a predetermined high temperature. It is to be understood that the water flowing upwardly through the duct is always heated to the desired high temperature value irrespective of whether the surrounding water in the tank is hot or cold. After the water in the upper portion of the tank has thus been heated, the water in the lower regions of the tank will be heated to the high temperature value. An important feature of this arrangement is that the water is heated in the lower regions of the tank without a substantial increase in the temperature of the water at the top of the tank.

When the water throughout the tank has been heated substantially to the selected high temperature of say 150° F., the lower thermostat 41 will operate to deenergize the heating element 16. It will be understood that if the water in the lower portion of the tank be cooled to a somewhat lower temperature, the thermostat 41 will again operate to reenergize the heating element 16 so as to maintain the hot water supply. In this manner the lower thermostat operates to maintain the water throughout the tank substantially at the predetermined temperature of 150° F.

If the heater be shut off and the water cools or the tank be replenished with cold water, the thermostat 33 operates to close the valve 32 so that when the heater is again connected hot water will be made available within a relatively short period of time.

If the tank be filled with cold water and if it be desired to heat but a relatively small quantity of water, the switch 48c will be moved to its right-hand position so as to connect the heating element 16 with the source 50 and so as to include the thermostat 40 in a controlling circuit for the heating element. Under these conditions the water will be heated in substantially the same manner as when the switch 48 was in its left-hand position, but in this case, however, when the hot water level reaches the upper thermostat 40, this thermostat in responding to the increase in water temperature will open the energizing circuit for the heating element 16, and will not reclose this energizing circuit until the water at the level of the thermostat has been cooled somewhat. In the event the water has been cooled somewhat either because of hot water draw offs or because of radiation losses, the thermostat will reenergize the heating element 16. In this manner the upper thermostat will control the heating element to maintain a relatively small amount of water in the upper regions of the tank at the predetermined temperature of 150° F.

While the thermostats 40 and 41 have been shown as of the type which will operate to maintain the water in their respective tank portions at a substantially uniform temperature, it is to be understood that these thermostats may be of the manual or mechanical reset type. In other words, these thermostats may be of the type which will operate to cut off the heating means when the water in their respective tank regions has attained the desired high temperature, but will not operate to reapply the heating means until they have been reset, irrespective of the water temperature.

While my invention is particularly useful in connection with the specific heater shown in Fig. 1 in that hot water is rendered available within an extremely short period of time and is heated substantially uniformly throughout the tank, it is to be understood that my invention is applicable to other forms of water heaters wherein the heated water is delivered to a selected tank region, the essential feature of my invention being the provision of means for controlling the heating means for a hot water heater responsively to the temperature of the water in selected regions of the tank so that the heating means can be controlled to maintain a relatively small quantity of heated water, or if it be desired, to maintain considerably larger quantities of hot water.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

What I claim as new and desire to secure by Letters Patent of the United States, is,—

1. A liquid heater comprising a tank, a single source of heat for said tank, means for delivering the fluid heated by said source to the upper portion of said tank, means responsive to the temperature of the fluid in said upper portion controlling said heat source to shut off the heat when the fluid in said upper portion is heated to a predetermined high temperature, means responsive to the temperature of the fluid in the lower end of said tank controlling said source of heat to shut off the heat when the fluid in said tank above said lower thermostat attains a predetermined high temperature and means for selectively rendering said temperature responsive means effective to control said heating means whereby either the liquid in said upper portion only or the entire contents of said tank above said lower thermostat can be heated as desired to said respective predetermined temperatures.

2. A water heater comprising a tank, a duct communicating with upper and lower regions of said tank so that said duct and said tank constitute a closed loop for the circulation of water, a single source of heat for applying heat to the water in said duct so that a thermal flow of water is set up in said duct in an upward direction, a thermostat responsive to the temperature of the water in an upper region of said closed loop for controlling said single source of heat to maintain only the water in said upper region heated at a predetermined temperature, a second thermostat responsive to the temperature of the water in a lower region of said closed loop for controlling said single source of heat to maintain the entire contents of said tank above said lower region heated to a predetermined temperature, and means for selectively rendering said thermostats effective to control said heating means whereby said single source of heat can be utilized at will either to heat the water in said upper zone only to a predetermined temperature or to heat the entire contents of said tank above said lower region to a predetermined temperature.

3. A water heater comprising a storage tank, a duct communicating with the upper and lower end portions of said tank, an electric heating unit in said duct arranged to heat the water therein whereby a thermal flow of water is set up in said duct from the lower to the upper ends thereof, the heated water being deposited in the upper portion of said tank, a thermostat responsive to the temperature of the water in said upper portion controlling said heating unit so as to deenergize said unit when the hot water line reaches said thermostat and to reenergize said unit when the cold water line reaches said thermostat so that said unit is controlled to maintain a relatively small quantity of water in said upper portion at a predetermined high temperature, a switch controlling said thermostat so as to render it effective and ineffective at will to control said heating unit, and a second thermostat responsive to the temperature of the water in the lower portion of said tank controlled by said switch and rendered effective thereby to control said heating unit so as to deenergize said unit when the hot water line reaches said lower thermostat and to reenergize said unit when the cold water line reaches said lower thermostat so that said unit is controlled to heat the contents of said tank to a predetermined high temperature, said switch controlling said thermostats so that only one at a time can be rendered effective to control said heating element, whereby either a relatively small quantity of water can be heated in the upper portion of said tank or the tank contents can be heated, as desired.

4. A water heater comprising a tank, a duct communicating with said tank at its upper and lower ends, an electrical heating element in the lower portion of said duct, a source of electrical supply for said heating element, a thermostat responsive to the temperature of the water in an upper region of said tank, a second thermostat responsive to the temperature of the water in a lower region of said tank, electrical connections between said source of supply and said heating elements including said thermostats and a control switch in said electrical connections arranged so that in one position thereof said heating element is disconnected from said source of supply, and in another position thereof said heating element is connected with said source in circuit with said first thermostat so as to be controlled thereby to heat the water in said upper region only to a predetermined temperature, while in still another position of said switch said heating element is connected with said source in circuit with said second thermostat so as to be controlled thereby so as to heat the entire contents of said tank above said lower region to a predetermined temperature.

5. A water heater comprising a tank provided with a hot water draw off at the top, a duct communicating with said tank at the top and bottom thereof, a heating element in the lower end of said duct for heating the water therein whereby an upward thermal flow of water is set up in said duct, temperature-responsive means for restricting the flow of water through said duct so as to cause the water to be heated to a relatively high temperature in passing through said duct whereby hot water is accumulated in the top of said tank and thereafter is heated in the lower portions of said tank, a thermostat responsive to the temperature of the water in an upper region of said tank for controlling said heating element to maintain a heated zone of water only in the upper portion of said tank, a second thermostat responsive to the temperature of the water in a lower region of said tank for controlling said heating element to maintain a heated zone of water in the portion of said tank above said lower region and a switch for rendering either of said thermostats effective at will for controlling said heating element, and for effecting the deenergization of said heating element.

CLYDE E. ALLEN.